Patented Apr. 23, 1940

2,198,219

UNITED STATES PATENT OFFICE 2,198,219

RETARDING OXIDATION

Sidney Musher, New York, N. Y., assignor to Musher Foundation Incorporated, New York, N. Y., a corporation of New York No Drawing. Application March 22, 1939,
Serial No. 263,429

6 Claims. (Cl. 99—128)

This application relates to the stabilization of oil containing pasty materials of the nature of peanut butter and the oils contained therein against oxidative deterioration and rancidity.

In accordance with this invention, oil containing seeds and nuts and the oils contained therein are substantially stabilized against oxidative deterioration by grinding to a paste condition and then subjecting to an elevated temperature after the grinding in order to develop marked stabilizing activity.

Among the oil containing seeds and nuts are included particularly those which contain sufficient oil so that upon grinding, a substantially non-powdery, pasty oily mass will be produced.

For example, peanuts, sesame seeds, and similar oil containing seeds and nuts, when ground between rollers or as in the manufacture of peanut or sesame butter are substantially oily and pasty. These products will, particularly when packaged into small containers for household distribution, develop rancidity in time and particularly when exposed to light or during the summer months. Moreover, as peanut butter, for example, is allowed to stand, the peanut oil separates out and rancidity of the surface oil occurs within a comparatively short period, thereby reducing materially the value of the entire product.

In accordance with this invention, after the roasting of the peanuts and the subsequent grinding, the ground, macerated, oily pasty mass is heated to a temperature of about 300° F. for a very short period, such as for about 3 minutes, during which time the ground peanut mass is preferably agitated. This short heat treatment markedly improves the stability of the peanut butter against oxidative deterioration and also improves the keeping quality of the oil contained in the butter or which gradually rises upon standing to the surface of the peanut butter.

Example I

Virginia peanuts shelled and blanched with the germ removed were roasted at about 300° F. for about 30 minutes and ground in a metal disc grinder to product a pasty oily mass. The peanut paste thus obtained was placed in a steam jacketed revolving drum and, while continuously agitating, was gradually heated to 250° F. and held at that temperature for 2 minutes, after which it was allowed to cool. The heated peanut paste was compared in keeping quality with the same product that had not been heated by holding samples in open glass containers at 125° F. At regular intervals, the peanut butter was mixed and samples removed for flavor observations.

|  | After— | | |
|---|---|---|---|
|  | 15 days | 30 days | 60 days |
| Unheated sample | No rancidity | Definite rancidity. | Very badly rancid. |
| Heated sample | ___do___ | No rancidity | Very slightly rancid. |

In addition to stabilizing the oily fibre containing mass obtained by the heat treatment, the oil rising to the surface upon standing as well as the oil obtained by the expression or extraction of the pasty mass is also very materially stabilized against oxidative deterioration.

Example II

Commercial peanut butter was divided into two lots. One lot was left untreated. The other lot was heated while agitating to 275° F. for 3 minutes, and allowed to cool. The two lots were allowed to stand at room temperature in closed containers. At regular intervals, a sample of the oil which came to the top of both lots was removed and tested for rancidity.

|  | Peroxides after— | | |
|---|---|---|---|
|  | 15 days | 30 days | 60 days |
| Unheated sample | 8.5 | *78 | 139 |
| Heated sample | 4.4 | 13.2 | *42 |

*Rancid.

Example III

Virginia peanuts were ground as stated before between discs until a pasty oily mass was obtained. One sample of the ground peanuts was heated to 400° F. for 1 minute while being agitated, and then allowed to cool. The other sample was unheated. The ground peanuts from both lots were expressed using a Carver type expeller and the oil obtained tested for stability by holding at 125° F. in open 50 cc. beakers.

|  | Peroxides after— | | | |
| --- | --- | --- | --- | --- |
|  | 2 days | 4 days | 8 days | 12 days |
| Oil from unheated peanuts | 4.5 | 25.8 | *135 | 360 |
| Oil from heated peanuts | 2.3 | 3.9 | 12.3 | 31 |

*Rancid.

The oils obtained in this manner by first subjecting the pasty mass to a substantially elevated temperature are of extreme importance for use for edible, industrial and other purposes in view of their markedly improved resistance to oxidative deterioration.

When the unground seeds or nuts are heated alone and without having been ground to an oily pasty mass, as in the case of roasting unground peanuts or sesame seeds, the desired increase in stability is not observed as it is first necessary to break through the cell structure forming an oily pasty mass and then to subject such oily mass to the elevated temperature.

The results obtained in accordance with this invention are particularly surprising when it is considered that when peanuts, for example, are roasted at the usual temperatures of 300° F. or above, they are considerably more subject to rancidity after such roasting than while in their unroasted state.

Moreover, although it is normally to be expected that the heat treatment given to an oil would decrease stability and render the heated oil much more subject to oxidation and rancidity, it is nevertheless found that the heat treatment applied to the oily mass in accordance with this invention is necessary to give markedly improved stability and to render the oil containing product considerably more stable than if such heat treatment had not been applied.

The heat treatment should desirably be to at least 250° F. and preferably at about 300° F., although slightly lower temperature may be employed such as as low as 225° F. particularly where the time of heating is extended. In order to produce the most marked results, however, the heat treatment should be at least 250° F. and preferably between 260° F. and 300° F. The peanut paste or similar product should be held at the elevated temperature for from a momentary period up to about 30 minutes. The longer the peanut butter is held at the elevated temperature up to about 5 to 10 minutes, the greater will be the stabilizing action.

The procedure outlined herein may particularly be used whenever an oily seed or nut contains in excess of about 40% total oil, under which condition a paste is formed upon grinding.

For example, in addition to peanuts and sesame, both of which contain over 40% oil content, there may also be utilized almonds, walnuts, cashew nuts and similar materials.

Where a seed or nut contains less than about 40% of oil as in the case of soya beans, cottonseed, poppyseed, wheat germ, corn germ, rice bran, oat germ, etc., such low oil containing seeds or nuts may be admixed with a sufficient quantity of added oil and then finely ground so as to produce an oily pasty mass, and such mass may then be subjected to the elevated temperature so as to produce a markedly stable product that will be substantially resistant to oxidative deterioration. For example, soya beans may be finely ground or milled into flour form. To that soya flour may be added from 20% to 40% or more of a glyceride oil and the oil thoroughly mixed in with the flour until an oily pasty mass is formed. Such mass should then be subjected to the elevated temperature.

The oil to be added for this purpose may be of any origin such as refined, crude, or other grade of oil such as cottonseed, corn, peanut, soya, sesame, linseed or other oil.

*Example IV*

To soya flour containing its full 20% oil content was added 30% refined deodorized soya bean oil and thoroughly mixed to produce a pasty mass. One lot of the soya paste was heated to 300° F. for 10 seconds while agitating and then allowed to cool. The other lot was not heated. Upon storage at room temperature, it was observed that the soya paste which had been heated showed about double the stability or resistance to rancidity than the unheated paste.

In a similar manner, the press cakes or residues of the oil bearing seeds or nuts may be treated by adding thereto a sufficient quantity of oil to produce a paste and heating to the activating temperature of stabilization.

There may also be treated in accordance with this invention the spices and spice residues. For example, cinnamon, cloves, clove residue following the extraction of clove oil, cardamon, allspice, ginger, or other spice or residue thereof may be mixed in an oily medium to produce a paste and then subjected to an elevated temperature to materially improve the stability of the paste and the oil contained therein, both essential and glyceride.

Cloves may, for example, be finely ground with 40% of refined cottonseed oil and heated to a temperature of over 300° F. Not only will the pasty mass be materially resistant to oxidative deterioration but the clove oil of both glyceride and essential oil character will have been rendered far more stable than when directly expressed or extracted from the clove without having been heated in paste form in the oil medium.

Where the oily pastes are subjected to an expression or extraction operation to remove most or all of the oil contained therein, not only the oils, but also the residue or press cake obtained will be markedly stabilized.

*Example V*

The soya pastes of Example IV were expressed using a Carver press and the press cakes containing about 10% oil were ground to a flour. The press cakes thus obtained were observed over a 90 day period for rancidity while stored at 105° F. The press cake obtained from the heated soya paste showed substantially no change for the duration of the experiment whereas the press cake obtained from the unheated paste showed definite rancidity at the end of 42 days.

In the case of nuts or seeds that are normally roasted in dry form before being ground, as in the case of roasted peanuts used in the manufacture of peanut butter, such product may be given only a partial roast in its whole condition, ground and finely milled and then heated in paste form for a sufficient period and at a sufficient temperature to complete the roasting and to develop the very marked antioxygenic character. Where peanuts are completely roasted, ground and then heated in accordance with this invention, care must be exercised that the heat does not burn or scorch the peanut butter. Therefore, allowance should desirably be made during the roasting of whole nuts or seeds for the heat treatment to be subsequently given to the product in paste form.

Generally, at least 75% of the total roasting may be given to the peanuts in their whole form so that during the relatively short time period that is required for the antioxygenic effect to be developed, the balance of the roasting may be completed.

The heat treatment given the peanuts in milled pasty oily form should desirably be applied by placing the peanut paste in a steam jacketed revolving drum so that the temperature of the peanut paste is gradually raised to the desired point. Sudden heating or direct flame exposure is undesirable in view of the fact that the peanut paste will under those conditions be very apt to burn and develop objectionable flavors.

Cacao beans may also less preferably be treated in this manner, and the cacao paste in the oily medium subjected to a temperature of about 225° F. in order to very materially improve the keeping quality of the chocolate, cacao butter and the cocoa press cake powder.

For example, the whole cacao nibs may be roasted for approximately 45 minutes instead of the usual 55 minute period at a temperature of 225° F.

The almost completely roasted nibs may then be cooled and milled using an upper stone rotating on a lower fixed stone whereby the cacao is dragged between the stones to form an oily paste. That paste may be placed in a jacketed revolving drum in which the temperature of the oily cacao paste is raised to about between 225° F. to 250° F. for a relatively short period, such as for from 5 seconds to 5 minutes. During this high heat treatment, the finely milled cacao mass is markedly changed in that there is developed in it substantially antioxygenic properties whereby its keeping qualities are improved to a very great degree.

Less preferably, there may be utilized the finely divided cereals such as oats, barley, maize, wheat, rye, etc., for admixture with an oil in sufficient quantity to produce an oily substantially water free paste and then to subject such mixture to a high heat. Such cereals are, of course in a totally different class since they are substantially devoid of oil content and will require admixture with not less than about 30% of oil to produce the desired paste.

With all of these materials and particularly in the case of the cereals, a small amount, less than 5%, and desirably less than 2% and as little as 0.05% of a sugar, such as dextrose, lactose, sucrose, etc., and a phosphatide, such as lecithin or similar material, may very desirably be added to the paste before the heating and a further very marked increase in stability will be observed. Sugar alone or lecithin alone in small amounts will show some desirable results, particularly when the paste to which these materials would be added contains the supplementing product, i. e., lecithin or sugar. Of particular value, however is the addition of a small amount of sugar and lecithin, preferably in proportions of from 1 part of one to 4 parts of the other. In any case, the addition should be made before the paste has been heated to the elevated temperature.

*Example VI*

Cacao nibs were roasted at 225° F. for 55 minutes. They were then finely milled to an oily paste as above described. To this paste was added 0.5% by weight of a 1:1 mixture of dextrose and lecithin and thoroughly distributed through the cacao paste by agitation. The paste was then placed in an oven maintained at 260° F. while agitating. When the paste reached a temperature of 225° F., it was removed and allowed to cool. The cacao product thus obtained was very substantially stabilized against oxidative deterioration and was found to be particularly resistant to tallowiness and off flavor development when used in the manufacture of whole milk chocolate.

The oily pastes treated in accordance with this invention should desirably be substantially anhydrous and water free. When water is present, an emulsion tends to form which does not readily permit the oil contained therein to be released and which seems to prevent proper and even heating without burning.

Although the heat treatment may be conducted in an atmosphere of inert gas or at reduced pressures, even if conducted in air at atmospheric pressure, the desired results will be obtained. This cannot be readily explained since it is normally to be expected that the heating of an oily material in air promotes oxidation and is objectionable even in the absence of oxygen, whereas in accordance with this invention, the heat treatment is necessary in order to produce the desired results.

Having described my invention, what I claim is:

1. A process of producing a stabilized peanut oil resistant to oxidative deterioration which comprises deshelling and blanching peanuts, roasting said peanuts, grinding the roasted peanuts to form a substantially water free finely milled oily paste, and then heating said paste to at least 250° F. for a relatively short period of time, and then removing the oil whereby a highly stabilized peanut oil is obtained.

2. A process of producing a stabilized peanut oil containing paste resistant to oxidative deterioration which comprises deshelling and blanching peanuts, roasting said peanuts, grinding the roasted peanuts to form a substantially water free finely milled oily paste, and then heating said paste to at least 250° F. for a relatively short period of time, whereby a highly stabilized peanut oily paste is obtained.

3. A process of producing a stabilized peanut oil containing paste resistant to oxidative deterioration which comprises deshelling and blanching peanuts, roasting said peanuts for a relatively short period, insufficient to develop the desired roasted flavor, grinding the partially roasted peanuts to form a substantially water free finely milled oily paste, and then heating said paste to at least 250° F., for a sufficient period to develop the desired roasted flavor, whereby a highly stabilized peanut oily paste is obtained.

4. A process of producing a stabilized oil containing oily paste resistant to oxidative deterioration which comprises grinding a substantially water free material selected from the group consisting of the seeds and nuts containing over 40% of oil, grinding said material to form a substantially water free finely milled oily paste and then heating said paste to at least 250° F. for a relatively short period of time, whereby a highly stabilized oil containing oily paste is obtained.

5. A process of producing a stabilized oil containing oily paste resistant to oxidative deterioration which comprises grinding a substantially water free material selected from the group consisting of the seeds and nuts containing over 40% of oil, grinding said material to form a substantially water free finely milled oily paste, adding thereto a small amount, less than 5%, of a sugar and phosphatide, and then heating said paste to at least 250° F. for a relatively short period of time, whereby a highly stabilized oil containing oily paste is obtained.

6. A process of producing a stabilized glyceride oil resistant to oxidative deterioration which comprises grinding a substantially water free material selected from the group consisting of the seeds and nuts containing over 40% of oil to form a substantially water free finely milled oily paste, heating said paste to at least 250° F. for a relatively short period of time, and then removing the oil whereby a highly stabilized glyceride oil is obtained.

SIDNEY MUSHER.